Patented Nov. 26, 1929

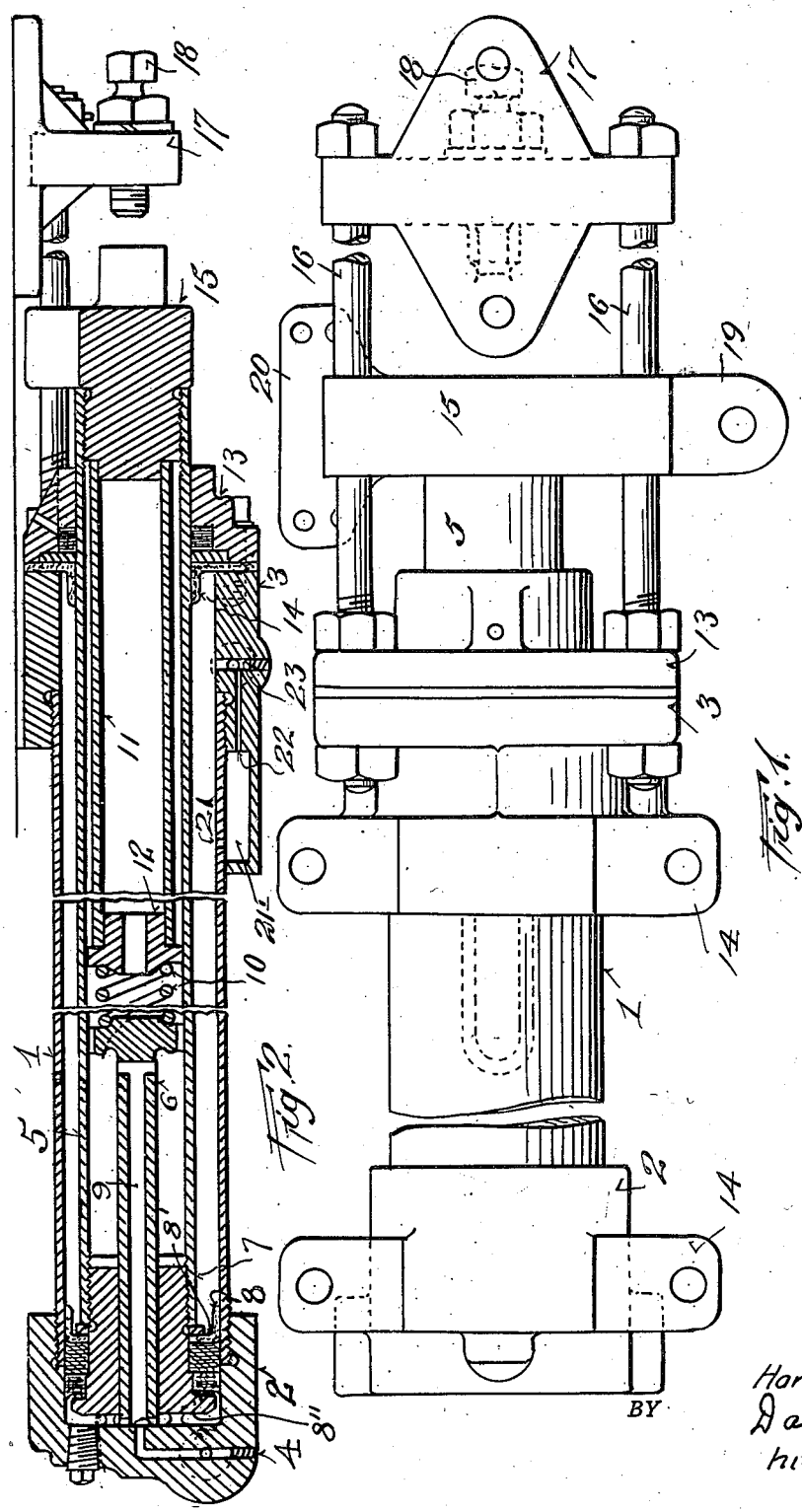

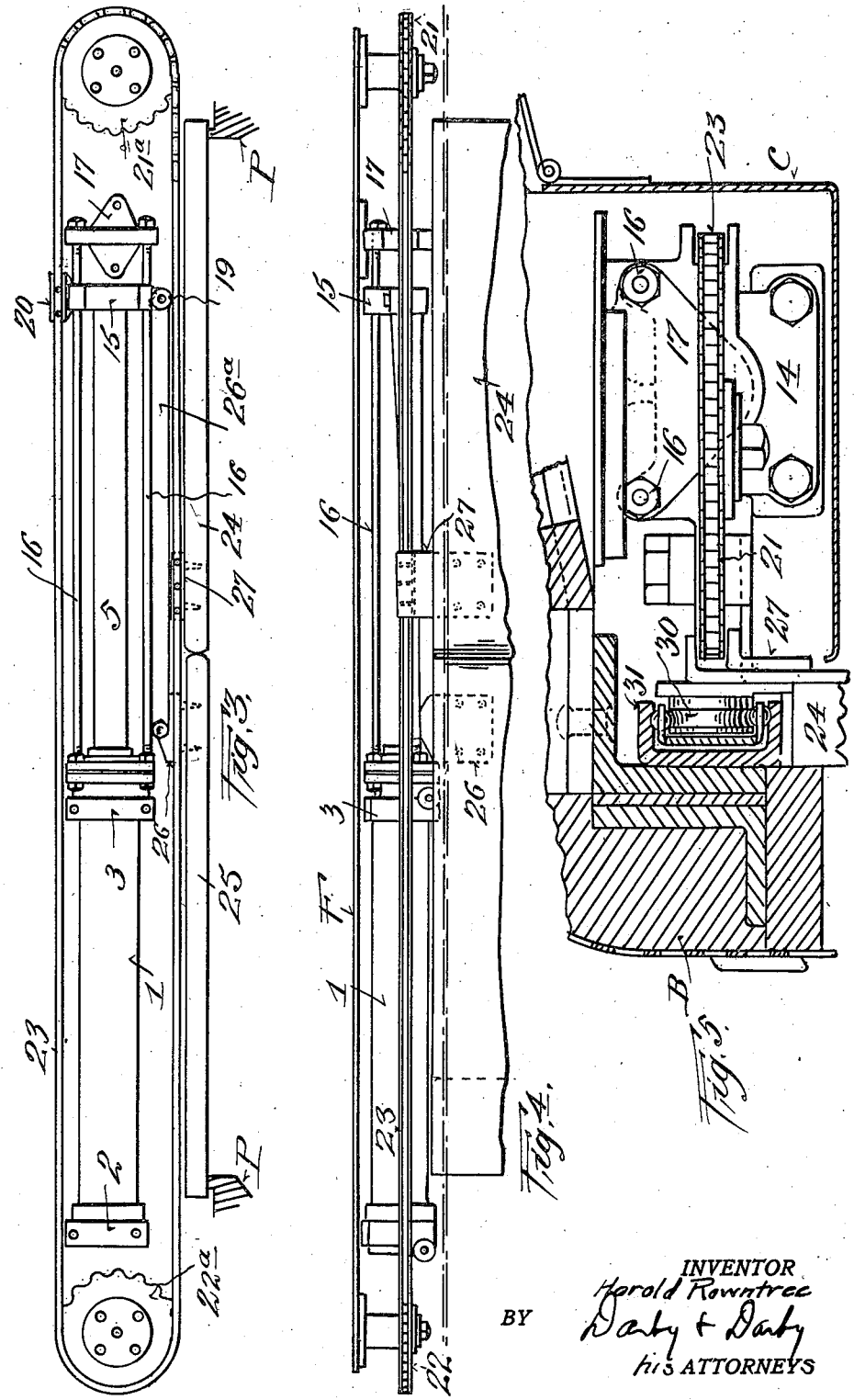

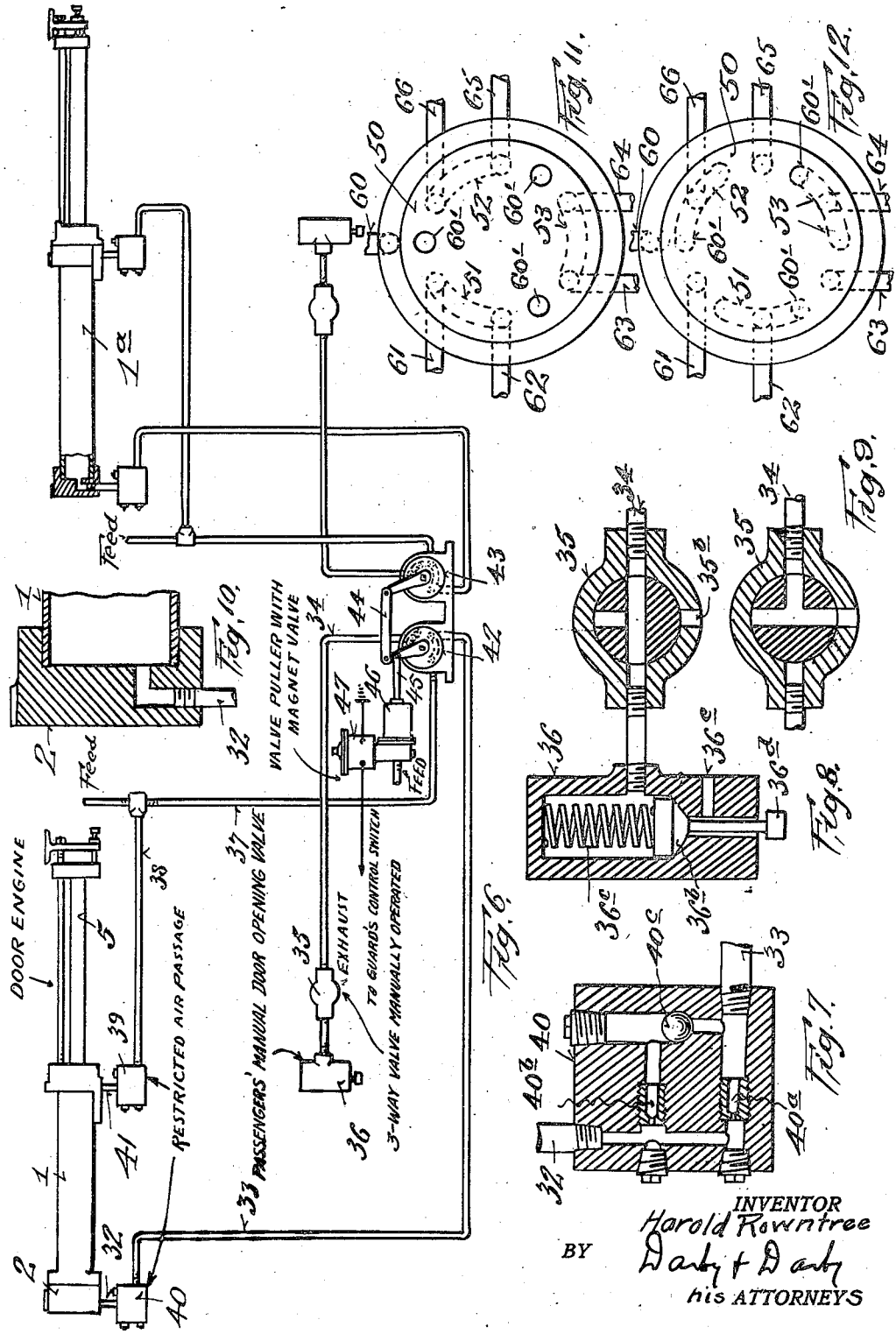

1,737,433

UNITED STATES PATENT OFFICE

HAROLD ROWNTREE, OF SCARSDALE, NEW YORK, ASSIGNOR TO NATIONAL PNEUMATIC COMPANY, OF NEW YORK, N. Y., A CORPORATION OF WEST VIRGINIA

DOOR-OPERATING SYSTEM

Application filed June 16, 1926. Serial No. 116,489.

This invention relates to a system for the controlling of doors of vehicles.

One of the objects of the invention is the provision of a novel door operating engine by means of which sliding doors on vehicles may be operated.

Another object of this invention is the provision of a single, differential fluid pressure operating engine by means of which the doors of a vehicle are maintained closed when pressure is admitted to the large face of the piston.

Another object of the invention is to secure by means of this construction, a door operating system which may be controlled by the release of the pressure on the large face of the piston.

A further object of this invention is a provision of a system of this type by means of which a valve is provided for releasing this pressure by the passengers themselves.

It is also an object of the invention to so arrange the system that the passenger controlled valves are connected to the system at the will of the car attendant.

A still further object of this invention is the provision of a form of differential engine so constructed that double sliding doors may be moved in opposite directions by means of a piston rod moving in one direction.

A further object of this system is a provision of means whereby it may be readily adapted for operation of the doors by the car attendant only when desired.

A further object of this invention is the provision of a novel cushioning means slidably mounted on the piston of the door engine and means for preventing the doors from opening should there be a leakage of fluid from the side of the cylinder in which the large piston face operates.

Another object of the invention is the provision of a system of the type having the advantages mentioned above which may be readily applied to a number of cars comprising a train so that as many doors as desired may be placed either under the control of the passengers or under the control of the car attendant, or partially under the control of both.

These and many other objects are secured by means of the invention described below.

This invention resides substantially in the construction, combination, arrangement and relative location of parts as will be clearly described in the following specification taken in connection with the drawings.

Referring to the drawings;

Figure 1 is a top plan view with some parts broken away of the fluid pressure operated engine;

Fig. 2 is a vertical cross sectional view of the engine of Fig. 1;

Fig. 3 is a top plan view showing the application of the engine to a vehicle having double sliding doors;

Fig. 4 is a side elevational view of the structure of Fig. 3;

Fig. 5 is an enlarged cross sectional view of a vehicle to which this invention has been applied;

Fig. 6 is a diagrammatic view of the fluid pressure circuit and the control means connected therein for controlling two engines;

Fig. 7 is a cross sectional view of the restricted air passage device;

Fig. 8 is a cross sectional view of the passenger operated valve and the three way cock;

Fig. 9 is a cross sectional view of the three way cock showing the valve rotated through 90°.

Fig. 10 is a cross sectional view of one end of the engine;

Fig. 11 is a diagrammatic view of a modified form of valve adapted for use in the system; and Fig. 12 is another view of the same valve shown in its rotated position.

Referring now to Figs. 1 and 2, the door engine is shown comprising the outer cylinder 1 having the end caps 2 and 3. In the end cap 2 is provided the passage 4 connecting with a threaded outlet in the cap shown in the dotted lines. Slidably mounted within the holow cylinder 1 is the hollow piston rod 5 having thereon, the two-faced piston 7 which is provided with the cup washer 8. Slidably mounted in the piston head is the plunger rod 6 having the longitudinal passage 9 therein. Secured by means of threads in the other end of the hollow piston rod is the plug 15 which serves as a centering means for the short hollow tube 11 having seated in its inner end the cap member 12. A spring 10 is seated on the cap 12 at one end and has its other end pressing against the head on the plunger 6 so as to urge it to the left (Fig. 2). The hollow piston rod is intended to slide through the cap 13 secured to the cap member 3 and a washer 14 is provided to prevent leakage at this point. Two parallel spaced rods 16 are bolted to the cap member 3 and the cap 13 and serve to clamp them together. These rods extend through bores in the member 15 and terminate in the support 17 upon which is mounted the stop bolt 18 by means of which the length of the piston stroke may be adjusted. It will be noted that the member 15 has the integral projection 19 mounted thereon for a purpose to be shown hereinafter and projecting from its other end is the plate like projection 20 which has a purpose to be later described. A small hole 21 extends through the cylinder wall 1 into a small enclosed space 21' which is connected to the passages 22 and 23 formed in the cap member 3. It is intended that fluid pressure will always be applied to the small face 8' of the piston and when it is desired to force the piston to the right an equal fluid pressure will be applied to the large face 8'' of the piston to force it to the right (Fig. 2). This result is secured by reason of the difference in area of the two faces 8' and 8''. When the piston is at the extreme right of its movement it will lie between the small ports 21 and 23. It is in this position that the doors are closed. Should for any reason fluid leak from the left end of the cylinder, the doors would tend to open, but since the space on the right of the piston is in communication with the space at the left of the piston, a balancing of pressure will be secured through the port 21, space 21', passage 22 and passage 23.

Referring now to Figs. 3 and 4, an endless chain is shown mounted on the rotatable sprockets 21ª and 22ª which chain is secured to the head 15 by means of the plate like projection 20. The chain is also secured by means of the attaching member 27 to door 24 so that any movement of the chain will be imparted to the door 24 which is intended to slide in the door frame P. The other door 25 adapted to slide in the opposite direction in the door frame P has mounted thereon a plate member 26. Pivotally connected to this plate member at one end is the rod 26ª which is pivotally secured at its other end to the projection 19 of the member 15. In the position shown in Figs. 3 and 4 the doors are closed with the piston rod 5 fully extended from the cylinder. When pressure is released from the left hand end of the cylinder the pressure in the right hand end of the cylinder will force the piston to the left. This will draw the upper side of the chain (Fig. 3) to the left causing the door 24 to move to the right and, at the same time, the door 25 will move to the left since it is connected by the rod 26ª to the piston rod which is moving to the left.

In Fig. 5 the car frame is shown at B and the door 24 is shown mounted on the rollers 30 operating in the ball race track 31. The door is shown secured to the chain 21 by the plate 27. The whole structure is enclosed within a protecting casing C.

One of the possible forms of the system adapted for use with my novel engine, is disclosed in Fig. 6. The pipe marked "Feed" is connected through the pipe 38, the restricted passage device 39 and the short pipe 41 to the space communicating with the small face of the piston. The "feed" pipe is also connected by means of the pipe 37 to the valve 42 and thence through a groove in the valve head to the pipe 33 when the valve is in the position shown in the figure. This pipe is connected to the space in which the large face of the piston operates through the restricted air passage 40 and the short pipe 32. A pipe 34 connects with the valve 42 and has connected therein, the three way valve 35. A passenger door opening valve 36 is connected to the other end of the three way valve. An exactly similar arrangement is shown for the engine 1ª to which is connected the valve 43 which is of construction similar to the valve 42. The valve stems of these valves are connected together by the link 44 and are adapted to be operated in unison by means of the valve puller 46 which operates them through the agency of the rod 45. Fluid pressure is supplied to the valve puller 46 through the pipe marked "Feed" and is controlled by means of the magnet valve 47. No further description of the magnet valve and valve puller will be given here since their construction and operation are very well known in the art.

Before describing the operation of this system attention is directed to Figs. 7 to 10. In Fig. 7 is shown the restricted air passage device 40 which comprises the two speed plugs 40ª and 40ᵇ and the ball check valve 40ᶜ. When fluid pressure is admitted through pipe 33, the ball will rise and air will be admitted to the pipe 32 through both of the speed plugs 40ª and 40ᵇ and to the engine but when the fluid is being exhausted from the engine, the ball will seat so that fluid can escape to the pipe 33 only through the speed plug 40ª. By use of this device relatively rapid admission of fluid to the engine is obtained but its exhaust therefrom will be somewhat slower since the exhaust passage through the plug 40ª is smaller. It is, of course, evident that by varying the sizes of the openings in the speed plugs, any desired relative speeds of operation may be secured.

The passenger door opening valve 36 comprises a body within which is mounted the valve 36ᵇ which is normally maintained on its seat by means of the spring 36ᶜ. A handle for raising the valve off its seat is shown extending through the wall of the valve at 36ᵈ. The three way cock 35 is shown with the exhaust port 35ᵇ extending through the wall thereof so that when the valve is in the position shown in Fig. 9 the pipe 34 will be opened to exhaust. In Fig. 10 is shown an enlarged view of the cap 2 and the pipe 32 communicating with the cylinder 1.

The operation of the system shown in Fig. 6 is as follows: Fluid pressure is admitted through the pipe marked "Feed", pipe 38, restricted air passage device 39 and through pipe 41 to the small face of the piston. It will be seen that fluid pressure is always maintained at this end of the cylinder. Admission of fluid pressure to the other end is controlled by means of the valve 42 and is admitted thereto when the valve is in the position shown in the figure. The piston 5 is then extended from the cylinder and the doors are closed. When the vehicle comes to a stop, the car attendant, either the motorman or the conductor, closes an electric circuit to the magnet valve 47 which operates to admit fluid pressure to the valve puller 46 to move the valve 42 so that pipe 33 is connected through the valve to the pipe 34. In this arrangement the three way valve 35 will be in position shown in Fig. 8. The operation of the doors is then under the control of the passengers who, by depressing the valve stem 36ᵈ, open the pipe line leading from the left end of the cylinder 1 to the atmosphere. The air is then slowly exhausted from this end of the cylinder through the speed plug 40ᵃ and through the pipe as described via the exhaust port 36ᵉ. The doors are then slid in opposite directions as has been described in connection with Figs. 3 and 4. The speed with which the doors open depends upon the size of the passage in the speed plug 40ᵃ. It is intended to supply the passenger valves 36 at each of the doors, both on the inside and on the outside of the car so that passengers may either board or depart from the car. When a complete change of passengers has been completed, the car attendant will operate the magnet valve 47 so as to return valve 42 to its position shown in the figure. Fluid is then admitted to the large end of the cylinder to close the doors. It is evident from Fig. 8, that the valve 36ᵇ recedes of itself upon release of pressure upon its handle 36ᵈ. An exactly similar operation takes place with the system connected with the engine marked 1ᵃ and the valve 43 and it is not thought necessary to describe its operation in detail. The main purpose of showing the two systems connected together, was to make it clear that it is within the contemplation of this invention to connect together as many of these door engines as is desired. It is also intended that one valve may be used to control all the doors, or one valve for each door, or any other desired arrangement which will readily suggest themselves to those skilled in the art.

Should it become desirable to have the doors entirely under the control of the car attendant, it merely becomes necessary to rotate the three way valve into its position as shown in Fig. 9 so that, upon the operation of the valve 42 through the agency of the magnet valve 47 and valve puller 46 to a position so as to connect the pipe 33 with the pipe 34 the fluid is exhausted from the left hand end of the engine through the exhaust port 35ᵇ of the three way valve. This in effect merely cuts the passenger door opening valve out of circuit. In connection with the opening of the doors in order that at the last part of their movement they will not slam, the spring pressed plunger 6, (Fig. 2) is provided so that the piston will move to the left against the action of the spring 10 during the last portion of its stroke.

Manifestly if desired there could be an electric valve and a valve puller for each control valve but a more economical installation can be made by only using one magnet valve and one valve puller for all the doors on one side of each car. Manifestly also, the controlling valves for the engines on one side of the car could also be built into one large valve such as shown in Figs. 11 and 12 which is adapted to operate three engines. Fluid pressure is admitted through the pipe 60 to each of the ports 60'. In the position of the valve as shown in Fig. 11, the large end of the cylinders of the three engines would be connected through the pipes, 62, 64 and 66 to the exhaust lines, 61, 63 and 65 respectively through the grooves 51, 53 and 52 in the valve head. When the valve is rotated to the position shown in Fig. 12, the pipes 61, 63 and 65 are disconnected from the engines and the pipes 62, 64 and 66 are connected through the grooves 51, 53 and 52 to the ports 60' which are connected by passages not shown to the fluid pressure "feed" line 60. Fluid pressure would then be fed to the large ends of the engines to force the doors closed. It will be evident that this valve may be electromagnetically controlled, pneumatically controlled or manually controlled.

It will be evident from the foregoing description that the invention disclosed within has many novel and valuble features and it is desired not to be strictly limited to the form of invention disclosed by the way of illustration since many changes in details of construction and arrangement of parts will no doubt occur to those skilled in this art. It is therefore intended to be limited to the scope of the invention as defined in the claims.

What I seek to secure by United States Letters Patent is:

1. In a door operating system for passenger vehicles in combination with a two part door comprising two sections mounted to slide in opposite directions in the same plane of a single power device connected to both parts of said door for sliding them and a hand operated control device connected to said power device to be operated by a passenger to operate said door.

2. In a door operating system for passenger vehicles in combination with a two part door comprising two sections mounted to slide in opposite directions in the same plane, of a differential fluid pressure operated engine connected to both parts of said door, said engine being connected so as to normally maintain the door closed and a hand operated passenger control valve for exhausting fluid pressure from said engine to cause it to open said door when operated by a passenger.

3. In a system for operating a plurality of doors the combination with double sliding doors of a single differential fluid pressure operated engine adapted to normally maintain the doors closed, means under manual control for opening said doors and electromagnetically operated means under the control of a train attendant for connecting said manual means to said engine.

4. In a system for operating a plurality of doors the combination with double sliding doors of a differential fluid pressure engine having a piston with faces of unequal areas for sliding the doors in opposite direction, valves at said doors for actuating said engine and means controlled by a train attendant for putting said valves in control of said engine, said fluid pressure operated means being provided with means for preventing the doors from opening should fluid pressure leak from behind the large piston face.

5. In a system for operating a plurality of doors on passenger vehicles the combination with double sliding doors of a single differential fluid pressure operated engine having a piston with faces of unequal areas adapted to normally maintain the doors closed and manual means under the control of the passengers for opening said doors, said fluid pressure operated means being provided with means for preventing the doors from opening should fluid pressure leak from behind the large piston face.

6. In a system for operating a plurality of doors on passenger vehicles the combination with double sliding doors of a single differential fluid pressure operated engine having a piston with faces of unequal areas adapted to normally maintain the doors closed and manual means under the control of the passengers for opening said doors and electro-magnetically operated means under the control of a train attendant for connecting said manual means to said engine, said fluid pressure operated means being provided with means for preventing the doors from opening should fluid pressure leak from behind the large piston face.

7. In a system for operating a plurality of doors the combination with double sliding doors of means for operating said doors, valve means for controlling said means and independent means for putting said controlling means in operative relation with said door operating means and means for preventing too rapid operation of the doors.

8. In a system for operating a plurality of doors in combination with double sliding doors of means for operating said doors, means for controlling said means and independent means for putting said controlling means in operative relation with said door operating means and a spring pressed plunger slidably mounted in the piston of said operating means to cushion the movement of the piston.

9. In a system for operating a plurality of doors the combination with double sliding doors of means for operating said doors, means for controlling said means and independent and electromagnetically controlled means for putting said controlling means in operative relation with said door operating means.

10. In a system for operating a plurality of doors the combination with double sliding doors of a fluid pressure operated engine for operating the doors, passenger valves for opening said doors and electromagnetically operated valves for putting said passenger vlaves in control of said engine said electromagnetically operated valves being adapted to close said doors when operated by a train attendant.

11. In a system for operating a plurality of doors the combination with double sliding doors of a fluid pressure operated engine for operating the doors, passenger valves for opening said doors, electromagnetically operated valves for putting said passenger valves in control of said engine, said electromagnetically operated valves being adapted to close said doors when operated by a train attendant and means for putting the engine exclusively under the control of the train attendant when desirable to permit of the complete operation of the doors by the train attendant.

12. In a system for operating a plurality of doors the combination with double sliding doors of means for operating said doors, means for controlling said means and independent means for putting said controlling means in operative relation with said door operating means, means for preventing too rapid operation of the doors and means for placing said independent means in complete control of the operation of the doors.

13. The combination with a plurality of sliding doors of balanced means for operating said doors, said means being connected to one of said doors by an endless chain and to the other by a rod to cause them to slide in opposite directions.

14. The combination with a fluid pressure engine having a crosshead of a plurality of sliding doors, an endless chain operated by the crosshead for moving one door, and a direct connection between said crosshead and the other door to cause it to slide in a direction opposite to the other door.

15. The combination with a fluid pressure engine of a door composed of sections, and connections between the engine and each of said sections, said connections being so arranged that the forces exerted by the engine are balanced in line with the line of motion of the engine.

16. The combination with a fluid pressure engine having a crosshead of a door composed of sections, an endless chain attached to one side of the crosshead and attached to one of said door sections, and a direct connection between the other side of the crosshead and the other of said door sections.

In testimony whereof I have hereunto set my hand on this 14th day of June, A. D. 1926.

HAROLD ROWNTREE.